United States Patent [19]
Konecny

[11] Patent Number: 5,453,594
[45] Date of Patent: Sep. 26, 1995

[54] RADIATION BEAM POSITION AND EMISSION COORDINATION SYSTEM

[75] Inventor: Karl F. Konecny, Tigard, Oreg.

[73] Assignee: Electro Scientific Industries, Inc., Portland, Oreg.

[21] Appl. No.: 133,959

[22] Filed: Oct. 6, 1993

[51] Int. Cl.$^6$ ................................................ B23K 26/00
[52] U.S. Cl. ........................ 219/121.61; 219/121.62; 364/474.08
[58] Field of Search ............... 364/474.08; 219/121.62, 219/121.83, 121.61, 121.8, 121.6, 121.29

[56] References Cited

U.S. PATENT DOCUMENTS

| | | | |
|---|---|---|---|
| 4,914,599 | 4/1990 | Seki et al. | 364/474.08 |
| 5,004,889 | 4/1991 | Yamazaki et al. | 219/121.61 |
| 5,012,069 | 4/1991 | Arai | 219/121.62 |

FOREIGN PATENT DOCUMENTS

| | | |
|---|---|---|
| 0207172 | 1/1987 | European Pat. Off. |
| 0282599 | 9/1988 | European Pat. Off. |
| 0334963 | 10/1989 | European Pat. Off. |
| 0358771 | 3/1990 | European Pat. Off. |
| 0393650 | 10/1990 | European Pat. Off. |
| 61-226198 | 10/1986 | Japan ................ 219/121.61 |
| 61-229488 | 10/1986 | Japan ................ 219/121.61 |
| 61-226197 | 10/1986 | Japan ................ 219/121.61 |
| 62-9792 | 1/1987 | Japan ................ 219/121.62 |
| 62-9794 | 1/1987 | Japan ................ 219/121.62 |
| 64-11084 | 1/1989 | Japan ................ 219/121.6 |
| 3-238184 | 10/1991 | Japan ................ 219/121.6 |

*Primary Examiner*—Geoffrey S. Evans
*Attorney, Agent, or Firm*—Stoel Rives Boley Jones & Grey

[57] ABSTRACT

A radiation beam position and emission system coordinates the emission and position of a radiation beam to accurately move it along an intended path. This is accomplished by synchronizing a fixed clock that directs the motion of a servomechanism with a variable clock that controls beam emission from a radiation device. The synchronized clocks allow the beam to start emission when the servo moves the radiation device from which the beam exits. Sharp corners between first and second legs of a beam path are realized by turning off the beam at the site that will be the vertex of the desired corner and looping the beam emitting device along a path that reintersects the vertex at the same time the beam is restarted. This allows the impact path to continue along a trajectory away from the vertex at any desired angle. Since the beam is turned off while the servo repositions the radiation device, and is restarted only at the corner vertex, the first and second intersecting beam paths meet at a sharp corner. Such looping trajectories use this invention to ensure precise alignment of the end of the first leg and the beginning of the second, joining leg.

20 Claims, 4 Drawing Sheets

RADIATION BEAM POSITION AND EMISSION COORDINATION SYSTEM

TECHNICAL FIELD

This invention relates to an apparatus and a method for imposing predetermined patterns and materials on target matter with an intense radiation beam and, in particular, to such a system and method having beam emission and position coordination capabilities.

BACKGROUND OF THE INVENTION

The use of an intense beam of radiation to impose predetermined patterns or materials on target specimens requires a system that coordinates the emission and position of the beam. Lasers, electron guns, and high energy ion streams are examples of beam sources that require coordination between beam emission and position.

Conventional radiation beam position and emission coordination systems typically use a servomechanism, a simple logic function network, and an incremental position encoder to coordinate beam emission and position. Beam pulses are timed by a variable frequency clock while a separate, fixed frequency clock times the servomechanism movement between successive positions.

To move a laser beam, for example, along a predetermined path, data comprising the intended beam travel pattern are first resolved into a series of pattern data segments ("data segments"). Each data segment includes servomechanism trajectory information sufficient to command the servo through an intended beam motion along a corresponding target segment. Additionally, the data segment contains beam impact information used to direct whether and where the beam should impact the target.

As the servo moves the laser or target in correspondence with each data segment, and sequentially from data segment to data segment, the incremental encoder resolves measured beam position into beam position coordinate data. Whenever the beam position coordinate data coincide with a predetermined laser beam impact site, the servo provides to the laser excitation circuit a signal that starts pulsed laser beam emission. Whenever measured position matches a stored laser beam stop site, the servo provides to the laser excitation circuit a signal that ceases laser beam emission.

The data segments are devised so that the laser beam is either "on" or "off" throughout the entire segment. Therefore, laser beam emission should take place at the beginning and the end of each servo movement through a corresponding target segment. The beginning and end of a servo movement are timed by the fixed frequency clock. Therefore, if initial laser beam impact is intended at the beginning of a target segment move, a pulse request signal is sent to the excitation circuit when servo movement begins. Servo movement is timed from the fixed frequency clock; however, the occurrence of pulsed beam emission is derived from the variable frequency clock. The pulse request signal produced by the servo may occur when the separate variable frequency clock is between pulses. Consequently, beam emission may not start or stop until the variable frequency clock changes state.

There would, therefore, be a delay between the start or stop of the servo movement and pulsed laser beam emission. Consequently, the initial laser beam pulse may strike the substrate at a point after the beginning of a target segment or the last laser beam pulse may occur at a point before the end of the segment.

The asynchronous relationship between positional control and pulse emission becomes acute when two segments requiring laser beam emission are expected to meet. In such cases, there will be no laser beam impact at the intended junction between the two segments, thereby resulting in a gap between them.

Such gaps are particularly significant during the fabrication of electronic and optical devices requiring submicron precision. Integrated circuits, for example, are often fabricated to include multiple iterations of redundant circuit elements, such as memory cells. Such circuits are tested for cell-to-cell integrity. When defective cells are discovered, their locations are mapped by a program whose output can be used to control a laser beam to cut appropriate circuit links and thereby excise the defective cells and substitute replacement redundant cells. Because integrated circuit elements are frequently fabricated in submicron dimensions, such laser cutting operations require close control of beam impact position. Consequently, temporal or spatial inaccuracy in starting or stopping a train of laser beam pulses can lead to failure to excise, or implement, selected memory cells in the integrated circuit.

Additionally, integrated electronic circuits are fabricated with interconnected junctions of differentially doped semiconductor areas. Such junctions may be fabricated using either a diffusion process to grow ionic layers or high energy ion beams to implant ions directly into the substrate.

However, diffusion techniques grow ions vertically and laterally; such lateral diffusion blurs intended feature perimeters. In contrast, ion implantation exhibits no lateral diffusion; therefore, ion beam techniques are frequently preferred for small dimension junction formation. Consequently, techniques that improve the dimensional control of ion beam targeting lead to improved fabrication of small junction regions. As a particular example, emitter regions of transistors are sometimes smaller than other transistor features. Therefore, in very large scale integration techniques where small emitters are needed, temporal and spatial synchronization between ion beam excitation and position is critical.

Another solution to correlate beam emission and position uses an independent logic network to monitor a single axis at high sample rates. An incremental encoder resolves beam position into determined position coordinates. As the servo moves the beam across the target substrate according to encoder coordinate data, the independent logic circuit simultaneously compares position encoder data to predetermined beam pulse start and stop locations stored in random access memory. When a determined position corresponds to a beam start location, the logic network produces a signal that starts beam emission.

Such systems have inherent limitations. Since determined position data are compared to stored location data before the network starts beam emission, there is slew error as the servo moves the laser before emission can start. Compensation may be made for significant components of such errors; however, additional errors arise. Monitor board logic and servo logic independently decode the encoder data; therefore, a decoding timing differential is induced that is unpredictable and difficult to correct. Moreover, each added logic network can monitor only a single axis.

Both such prior art systems are also limited by the difference between position as determined from encoder coordinate data and predetermined location as stored in memory. Digital encodation of a dimensional continuum across a target will necessarily result in errors unless interpolation techniques are used, which result in additional financial and speed expenses.

SUMMARY OF THE INVENTION

Accordingly, an object of this invention is to provide an improved apparatus and method of using an intense radiation beam for accurately imposing intended patterns and materials on target substrates.

Another object is to provide an improved apparatus and method that coordinates beam position and excitation while maintaining predetermined beam emission.

A further object is to provide an improved, cost-effective technique for achieving dimensional and temporal coordination between radiation beam location and excitation.

Still another object of this invention is to provide an improved apparatus and method for forming electrical circuits on target substrate materials.

This invention is implemented in systems that use an intense radiation beam to impose predetermined patterns or materials on target substrates. Electron guns, lasers, and ion streams are examples of devices that generate such radiation beams. The invention coordinates the emission and position of a radiation beam to accurately move the beam along an intended path. This is accomplished by a technique that synchronizes the fixed clock that directs the servo with the variable clock that controls beam emission. The synchronized clocks allow the beam to start emission when the servo moves the substrate target.

The benefits of the invention become particularly significant for situations in which beam impact paths are expected to impose patterns that include sharp turns or contiguous segments. In a preferred embodiment, sharp corners between two legs of a beam path are realized by turning off the beam at the vertex of the desired corner and looping the beam-emitting device around a circuitous path to reintersect the vertex at the same time the beam is turned on. This technique allows the impact path to continue along a trajectory away from the vertex at any desired angle. The two intersecting beam paths meet at a shared corner because the beam is "off" while the servo loops the beam apparatus around the circuitous path and is restarted only at the corner vertex. Such looping trajectories require precision in the placement of the end of the first leg segment and the beginning of the joining segment. The invention also compensates for differences between the actual and predicted travel paths of the radiation emitting apparatus caused by friction, mass, and electrical control current variations. This is accomplished by modifying the predicted appropriate servo control current according to a series of previously measured differences between actual and predicted trajectory segments.

Additional objects and advantages of the present invention will be apparent from the following detailed description of a preferred embodiment thereof, which now proceeds with reference to the accompanying drawings.

DETAILED DESCRIPTION OF PREFERRED EMBODIMENT

Figure 1:
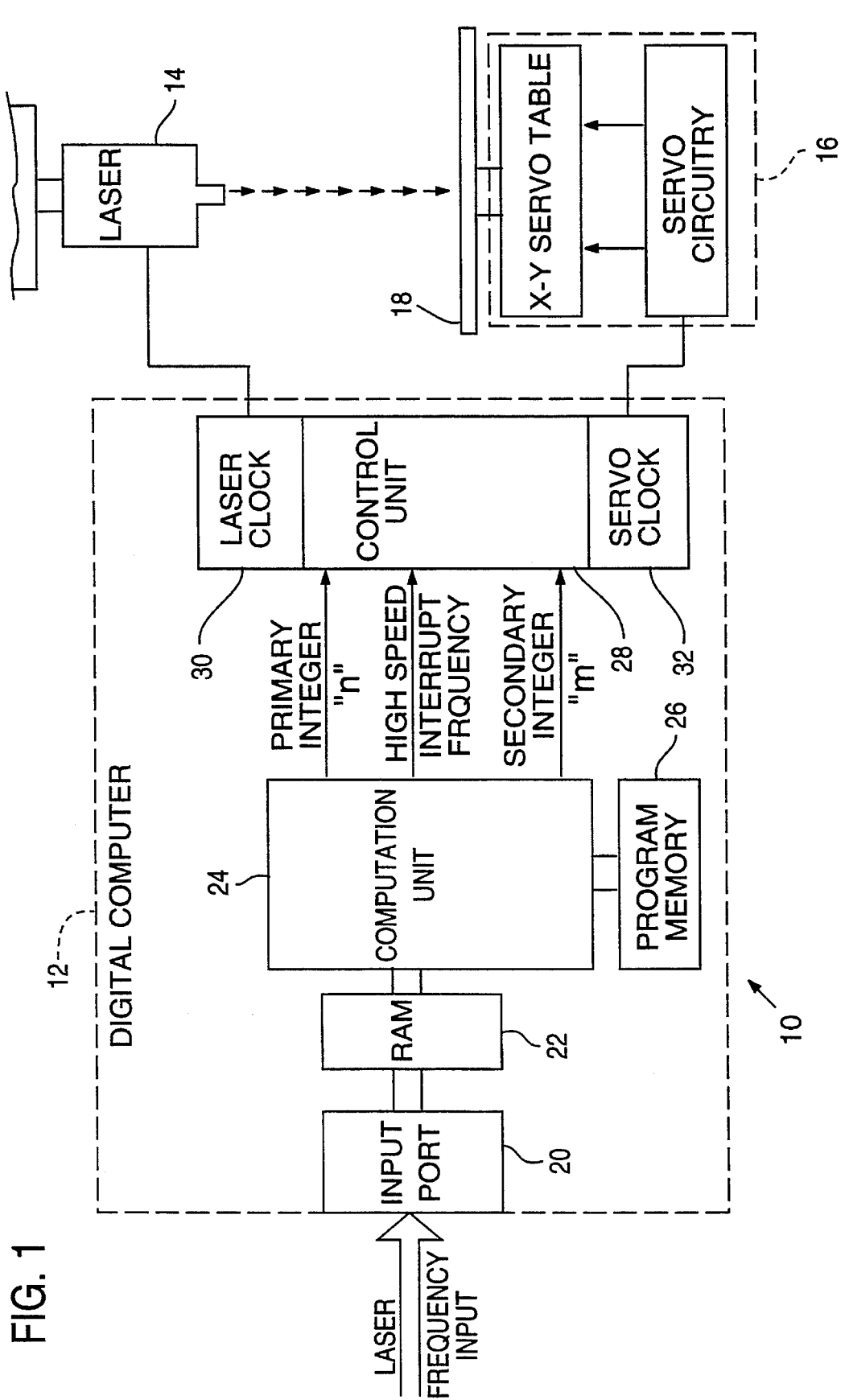
FIG. 1 is a block diagram of a preferred embodiment of a computer controlled radiation beam coordination system implemented in accordance with the invention.

FIG. 1 is a block diagram of a computer controlled radiation beam coordination system 10 that coordinates beam emission and position in accordance with the invention. Beam coordination system 10 is described herein only by way of example with reference to a laser-based resistor trimmer system that uses a digital computer 12 to control and coordinate the operation of a laser 14 and the motion of a servomechanism 16 that carries a target substrate 18. This is accomplished by the operation of computer 12, which derives from an external clock source a high speed interrupt clock frequency signal that functions as a reference to start and stop in coincidence the emission of the laser beam and the motion of servo 16.

With reference to FIG. 1, an input port circuit 20 receives input frequency data delivered in parallel form to system 10 for processing. The input frequency data are digital signals corresponding to desired laser frequency. A random access memory address set in RAM 22 receives and stores the input frequency data provided by input port 20.

A computation unit 24 is a microprocessor-based computer logic network that is under the software control of a program memory 26 and dedicated to process the input frequency data and develop output information in accordance with the invention. The frequency of the high speed interrupt is derived in computation unit 24 on the basis of a primary integer multiple "n" of the supplied laser frequency stored in RAM 22. The interrupt frequency is then used as a reference by a control unit 28 to a control a laser clock 30 and a servo clock 32 in coincidence. Laser clock 30 and servo clock 32 oscillate at the integer multiples "n" and "m" of the high speed interrupt frequency respectively. Laser 14 is enabled by laser clock 30 every "nth" oscillation of the high speed interrupt while servo 16 is enabled by servo clock 32 every "mth" pulse of the interrupt. Since both servo clock 32 and laser clock 30 are driven from the interrupt frequency signal, temporal correspondence between laser 14 and servo 16 is achieved, which in turn results in spatial correspondence between the intended and resultant laser impact patterns on target substrate 18.

Precision in solid-state computers is dependent upon internal waveform shape, which itself is dependent upon fabrication processing parameters and circuit layout and design. All computers have a resolution limit, which is expressible as a time by which two events must differ to be distinguishable. Therefore, servo 16 and laser 14 may be more accurately coordinated if they are signaled at a time that is an exact multiple of the resolution period of computer 12. Consequently, the resolution capacity of computer 12 is a factor in the coordination method of system 10.

Thus, in a preferred embodiment, the primary integer "n", which is the basis for the high speed interrupt frequency, is selected so that the resolution capacity of computer 12 best fits an exact number of times into the product of "n" and the initial laser frequency stored in RAM 22.

Several factors constrain the preferred high speed interrupt frequency. The frequency should be sufficiently low to keep relative accuracy high, but should be sufficiently high to result in oscillations significantly above any natural frequency of servo 16. Additionally, since servo 16 and laser 14 are signaled in whole number multiples "n" and "m" of the interrupt frequency, the preferred frequency range should also be wide enough to provide a broad selection of frequency combinations of "n" and "m" from which laser 14 and servo 16 can be signaled.

To select the primary integer "n" upon which the interrupt frequency is based and include compensation for the resolution of computer 12, computer 12 tests sequentially a series of integers for the best fit of the resolution capacity into the product of the tested primary integer ("$n_{px}$") and the provided laser frequency. This process may either evaluate all possible primary integers (ranging from $n_{p1}$ to $n_{px}$) that result in an interrupt frequency within a preferred range, or cease after an $n_{px}$ is found that results in a fit within an arbitrary tolerance to an integer value. In a preferred embodiment, the tolerance is 0.05. The series of candidate $n_{px}$ values is tested until an $n_{px}$ is found that results in a fit that is within 0.05 of an integer. The $n_{px}$ value found becomes the primary integer "n".

Once "n" is determined, the laser frequency stored in RAM 22 is then adjusted by computer 12 so that its resolution capacity will more precisely fit into the product of the adjusted laser frequency and "n". Because the primary integer "n" was selected to most exactly fit the resolution capacity of computer 12 into the product of "n" and the initially provided laser frequency stored in RAM 22, the initial laser frequency must be only minimally adjusted, if at all, to obtain a more precise fit.

A change in laser frequency results, however, in a change in the power distribution applied to target 18 by laser 14. Therefore, when the frequency of laser clock 30 is varied from the input frequency, computation unit 24 derives a corresponding correction factor to vary the velocity of servo 16 so that the power distribution applied to target 18 remains as initially intended.

EXAMPLE I

Figure 2A:
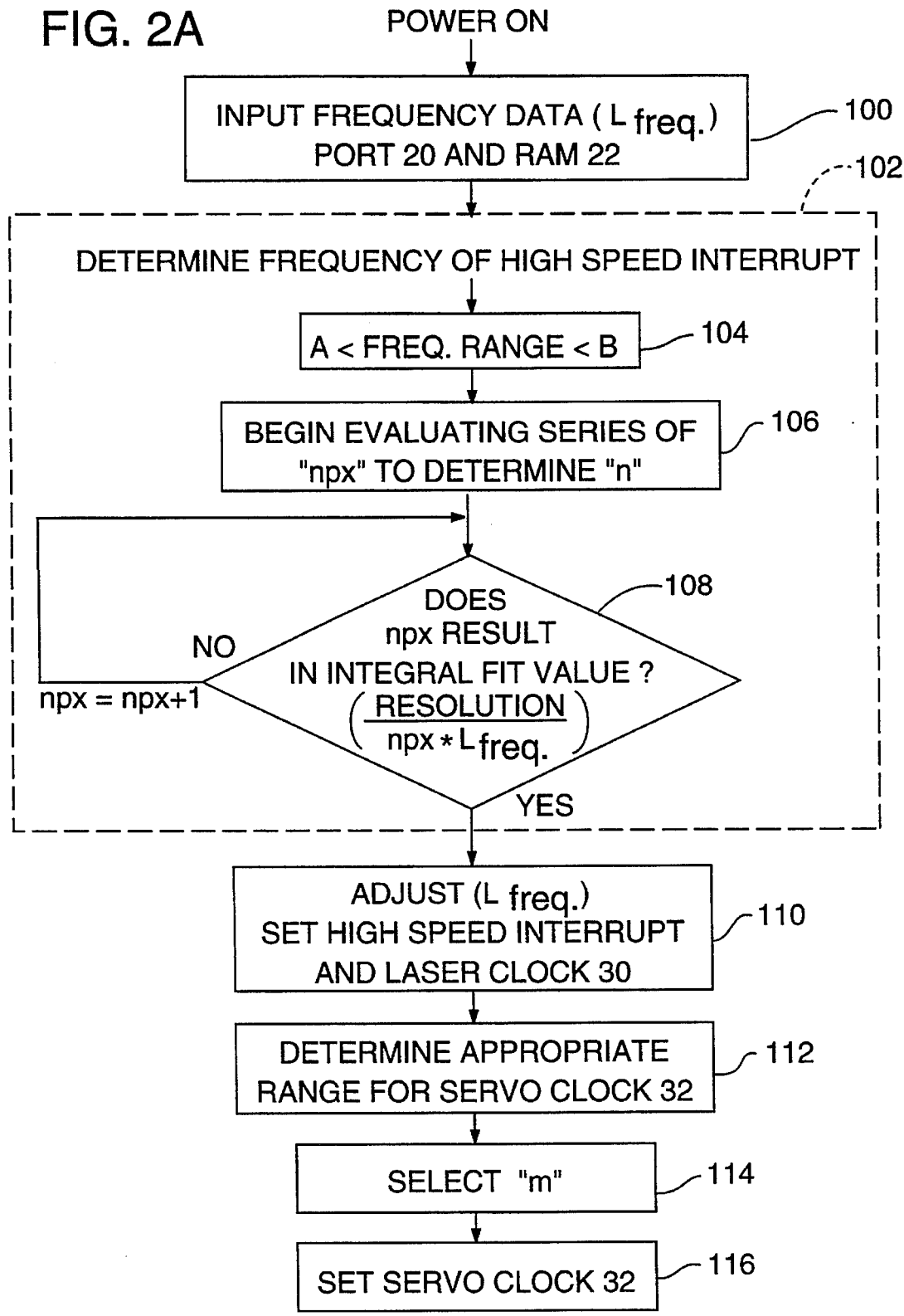
FIGS. 2A and 2B are flow charts illustrating the derivational relationship between operant parameters in a preferred embodiment of FIG. 1.
Figure 2B:
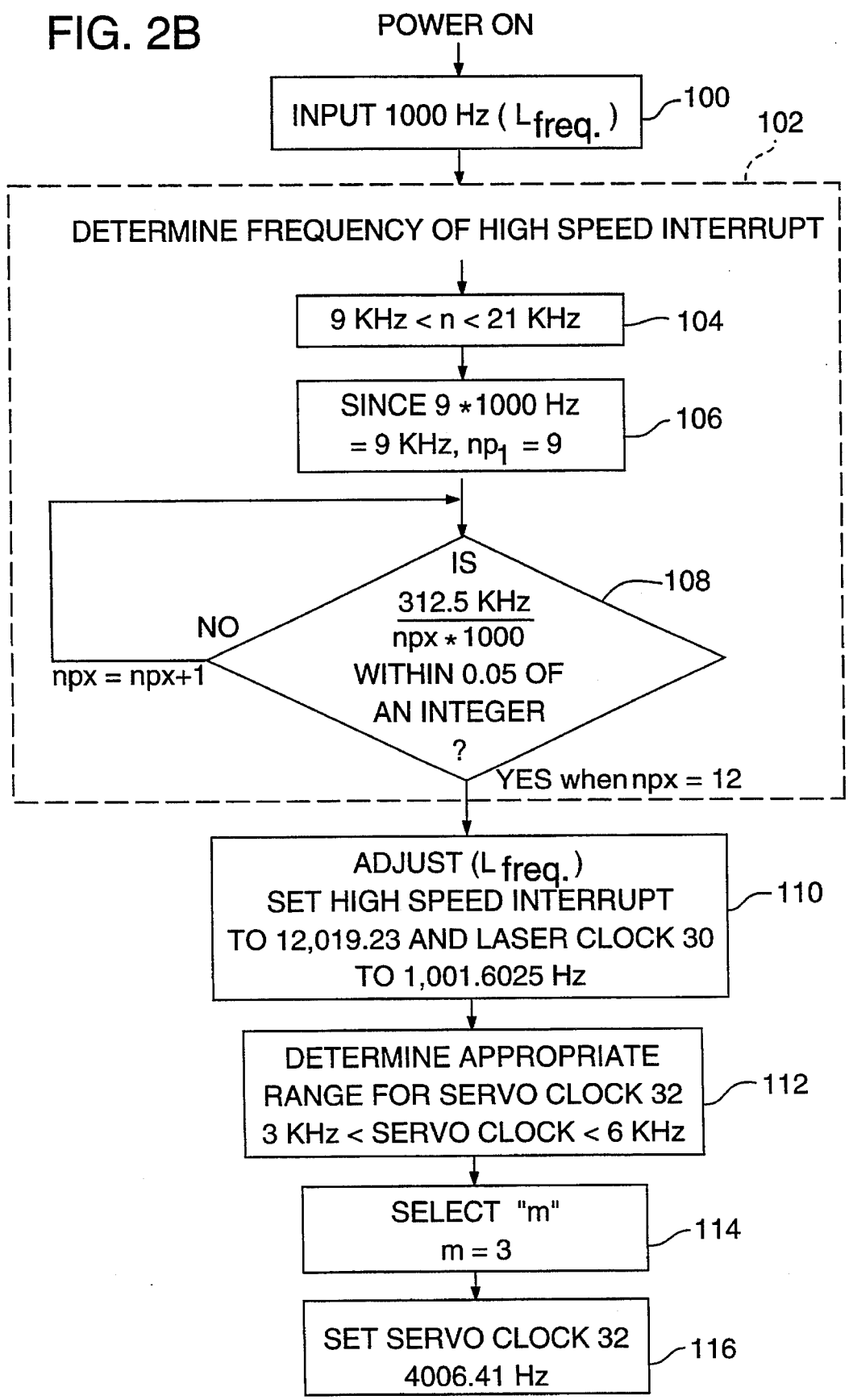

FIGS. 2A and 2B are flow diagrams of the processing steps for the coordination of servo clock 32 and laser clock 30 and thereby the motion of servo 16 and the operation of laser 14 by system 10 shown in FIG. 1. FIG. 2A shows the processing steps in general terms, and FIG. 2B shows the processing steps in specific terms using preferred numerical values. With reference to FIGS. 2A and 2B, after power is applied to system 10, the first step 100 is the loading through input port 20 of frequency input data into RAM 22 through input port 20. The input frequency data are signals corresponding to the desired laser frequency. In the preferred embodiment illustrated in FIG. 2B, the input data corresponding to a laser frequency of 1000 Hz are provided by an operator.

Step 102 entails the execution by computation unit 24 of the algorithm maintained in program memory 26 to derive the frequency of the high speed interrupt. The interrupt frequency should be a whole number multiple, "n", of the final laser frequency and be within a frequency range higher than any natural frequency of servo mechanism 16. Therefore, the initial step 106 of the process entails determining an appropriate range for the frequency of the high speed interrupt signal. In step 104 of FIG. 2B, servo mechanism 16 is an X Y Table and digital computer 12 is a 24-bit Motorola Model 56000 Digital Servo Processor. To provide a wide selection of available coordinated servo and laser clock frequencies well above the highest natural frequencies of the X Y Table, the interrupt frequency of the preferred embodiment of the example is between 9 and 21 kilohertz.

In step 106 of FIG. 2A, candidates for "n", labeled "$n_{px}$", are evaluated by computation unit 24 until a candidate "$n_{px}$" is found that results in the closest integral fit between the resolution capacity of computer 12 and the product of the "$n_{px}$" value and the provided laser frequency. Simultaneously, the product of a selected "n" and the provided laser frequency preferably results in a frequency for the interrupt within the preferred range.

Consequently, within this constraint, the evaluation of the product of primary integer candidates and the input frequency begins. Step 106 of FIG. 2B illustrates that using 9 as the first integer to be tested and the provided laser frequency of 1000 Hz results in an interrupt frequency of 9 KHz, which is the lower limit of the preferred range. The Motorola 56000 used in the preferred embodiment of FIG. 2B has a period resolution capacity of $3.2 \times 10^{-6}$ seconds. Therefore, the preferred primary integer is the $n_{px}$ value that results in the closest integral fit between the resolution capacity, $3.2 \times 10^{-6}$ seconds, and the product of $n_{px}$ and the laser frequency 1000 Hz. The frequency corresponding to the resolution capacity of the Motorola 56000, $3.2 \times 10^{-6}$ seconds, is 312.5 KHz. Therefore, with a laser frequency of 1000 Hz and a first candidate $n_{px}$ of 9, the 312.5 KHz frequency corresponding to the resolution capacity is divided by 9000 which is the product of the 1000 Hz laser frequency and the $n_{p1}$ value equal to 9. The resulting quotient, which is labeled the "fit value" in FIG. 2A, is 34.722 when $n_{px}$ equals 9 and the input data corresponds to 1000 Hz.

In step 108 of FIG. 2B, an arbitrary number, 0.05, is used to decide whether the fit value is sufficiently close to an integer. The closer the fit value lies to an integer value, the less adjustment will later be needed to precisely coordinate servo 16 and laser 14.

In the preferred embodiment illustrated in FIG. 2B, if the fit value is within 0.05 of an integer, the selection of the primary integer concludes; otherwise, the evaluation continues. When $n_{px}$=9, the fit value is 34.722. The value 34.722 is not within 0.05 of an integer. Therefore, in the preferred embodiment of FIG. 2B, the search for a primary integer "n" continues.

Consequently, the next candidate $n_{px}$ in the sequence, $n_{p2}$ or 10, is evaluated for a better fit. The next tested $n_{px}$ need not be the next highest value integer. Any method of determining the next $n_{px}$ to be evaluated may be used. For organizational simplicity, sequential evaluation is used in this preferred embodiment. Mathematical prediction techniques may be used, for example, to select the next $n_{px}$ to be evaluated.

Occasionally, an exact integral fit may be found, in which case the process of selecting an appropriate primary integer "n" can cease. Otherwise, the process continues until either a fit within an arbitrary tolerance level results, or the product of the provided laser frequency and the tested "n" would result in a high speed interrupt frequency above the preferred range from 9 KHz to 21 KHz. In the example, an $n_{px}$ of 10 results in an interrupt frequency of 10 KHz (10×1000). When 312.5 KHz, the frequency corresponding to the resolution capacity of the Motorola 56,000, is divided by 10 KHz, a fit value of 31.25 results. This result is not within the arbitrary tolerance of 0.05, and the process continues. The following Table 1 summarizes the fit evaluation results in a preferred embodiment for tested $n_{px}$'s ranging from 9 to 21:

TABLE 1

| $n_{px}$ | Fit Value |
|---|---|
| 9 | 34.722 |
| 10 | 31.250 |
| 11 | 28.409 |
| 12 | 26.042 |
| 13 | 24.038 |
| 14 | 22.321 |
| 15 | 20.833 |
| 16 | 19.531 |
| 17 | 18.382 |
| 18 | 17.361 |
| 19 | 16.447 |
| 20 | 15.625 |
| 21 | 14.881 |

As Table 1 shows, in the preferred embodiment of the example, an $n_{px}$ of 12 closely fits the resolution of the Motorola 56000 into the 12th multiple of 1000 Hz, the laser frequency stored in RAM 22.

As step 110 of FIG. 2A illustrates, the laser frequency stored in RAM 22 must be adjusted to provide a more exact fit between the laser frequency and computer 12 resolution. Computation unit 24 determines the degree of adjustment required by finding the frequency which, when multiplied by "n", will divide the frequency corresponding to the resolution of computer 12 into an integer value. In step 110 of FIG. 2B, the input frequency need be adjusted only from 1000 Hz to 1001.6025 Hz to result in exacting correspondence between the laser frequency and computer 12 resolution. The resolution of the Motorola 56000 will almost exactly fit 26 times into the product of 1001.6025 Hz, the adjusted laser frequency, and the primary integer "12". This is computed as follows:

*1001.6025=12,019.23

,500/12,019.23=26.0000017.

Other candidate $n_{px}$ values may be selected as primary integers with varying degrees of required adjustment in laser frequency. For example, an $n_{px}$ of 19 would require an adjustment in laser frequency from 1000 Hz to 1027.9605 Hz to coordinate laser frequency with the resolution of the Motorola 56000.

After the frequency of the high speed interrupt and laser clock 30 have been determined, an appropriate frequency for servo clock 32 is determined in computation unit 24. Servo clock 32 is triggered at a whole number multiple "m" of the interrupt frequency. However, servo clock 32 should not enable servo 16 at any frequency above the natural frequency of servo mechanism 16. Therefore, as step 112 illustrates, an appropriate range for servo clock 32 is first determined. In the preferred embodiment of the example, servo mechanism 16 is an X Y Table and consequently, an appropriate range for servo clock 32 is between 3 KHz and 6 KHz.

As step 114 shows, a secondary correlation integer "m" is determined so that when the interrupt frequency is divided by "m", the result is within a range above the highest natural frequency of servo 16. Then, as illustrated in step 116, the frequency of servo clock 32 is set by computation unit 24 to the quotient of the frequency of interrupt the high speed as divided by m.

Using an "n" of 12 for example, and a consequent interrupt frequency of 12019.23 Hz, which is the product of "n" and the adjusted laser frequency (12×1001.6025 Hz), a secondary correlation integer, "m", of 3 results in a preferred servo clock frequency of 4006.41 Hz. Since the servo clock 32 is available every third interrupt oscillation (12019.23/3=4006.41 Hz), and the laser clock 30 is available every twelfth interrupt oscillation (12019.23/12=1001.6025 Hz), the servo clock 32 and laser clock 30 may be coincident every twelfth oscillation of the high speed interrupt. Consequently, laser emission and servo motion may coincide every twelfth oscillation of the high speed interrupt.

EXAMPLE II

There may be no requirement for the final frequency of laser clock 30 to be as close possible to the initial provided laser frequency. In such cases, "n" may be selected without prior evaluation of a best fit between resolution capacity of computer 12 and the product of "n" and the initial laser frequency. In such a case, the laser frequency must be adjusted by a larger margin than that required if the prior best fit evaluation is made. However, in such an alternative embodiment, precision between servo position and laser emission may still be obtained.

Figure 3:
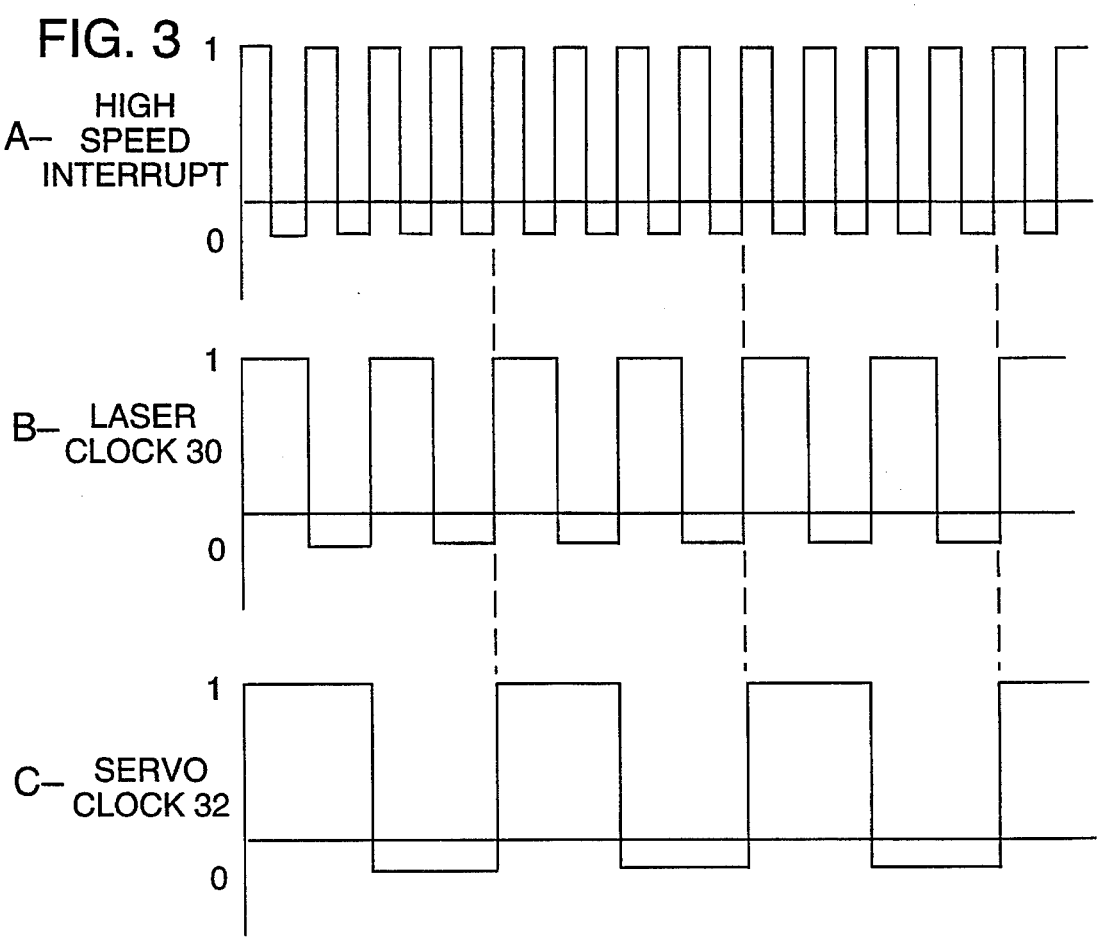
FIGS. 3A, 3B, and 3C show the timing relationships among the laser pulse clock, the servomechanism segment clock, and the high speed interrupt clock of the preferred embodiment of FIG. 1.

FIG. 3 illustrates the resulting timing relationship between the frequency of adjusted laser clock 30, the frequency of servo clock 32, and the interrupt frequency signal when an initial laser frequency of 8 KHz is provided to system 10 and primary integer "n" equals 2. Therefore, the interrupt frequency is 16 KHz (2*8000 Hz). To assess coordination with the resolution of the Motorola 56000, the 312.5 KHz resolution frequency of the 56000 is divided by the 16 KHz frequency of the high speed interrupt, resulting in a fit value of 19.53. Since 19.53 is closer to 20 than 19, 20 is selected as the integer multiple by which the 312.5 KHz resolution frequency should fit into the product of the laser frequency and the primary integer 2. The laser frequency is then adjusted by computer 12 as follows to force a more exact fit:

.5 KHz=adjusted laser freq*"n"*fit integer

.5 KHz=adjusted laser frequency**20

.5 Hz=adjusted laser frequency.

Therefore, 312.5 KHz is divided by 40 to result in an adjusted laser frequency of 7812.5 Hz. The frequency of the interrupt then equals the product of "n" and the adjusted frequency of laser clock 30 or in this embodiment, the product of 2 and 7812.5 Hz, which equals 15.625 KHz.

The frequency of servo clock 32 is the quotient of the high speed interrupt frequency divided by the secondary integer "m". Preferably, the frequency of servo clock 32 lies between 3 KHz and 6 KHz. Therefore, when a secondary integer "m" of 4 is chosen, and the interrupt signal has frequency of 15.625 KHz, a preferred servo clock frequency of 3906.25 Hz results. Since servo clock 32 oscillates every 4th oscillation of the interrupt signal or 3906.25 Hz, and laser interrupt clock 30 oscillates every second oscillation of the interrupt signal, or 7812.5 Hz, servo 16 and laser 14 may be signaled in coincidence every fourth oscillation of the high speed interrupt.

As shown in FIG. 3, laser clock 30, servo clock 32, and the high speed interrupt signal all display rising edges every fourth period of the interrupt. Consequently, laser emission and servo motion may coincide every 4th oscillation of the high speed interrupt.

EXAMPLE III

Servomechanisms are limited in their capability to respond to directive signals. When the combination of acceleration and trajectory commanded of a servo exceeds a servo response characteristic, the servo responds with unpredictable results. Consequently, before complex patterns are imposed on targets, a desired pattern is resolved into a series of motion directing segment data that will each require a move that is less complex than the response limit of the servo. When the segments are combined, the complex pattern will have been realized by combination of a series of simpler moves.

For example, when a desired target pattern includes a sharp corner, a series of simple segments is combined so that the servo is not required to either instantaneously decelerate to zero velocity before turning the corner or to turn the corner at a constant speed, either of which would require an infinite acceleration vector. Slowing the laser to a stop before making the corner is not desirable because laser power distribution is proportional to laser travel speed. A preferred solution is stop laser emission when the apex is reached, but continue the motion of the servo in a looping fashion to allow a laser beam coordinated with the servo operation to exactly reintersect the prior terminal point apex and thereby mesh the new direction of the beam with the terminal point of the prior direction of travel.

In a preferred embodiment, servo mechanism 16 is an X Y Table. Like all servos, the X Y Table has a response characteristic limit. Consequently, the pattern data stored in program memory 26 is resolved into a series of segments. Each segment is used by computer 12 to direct servo 16 through a move less complex in terms of acceleration and trajectory than the response characteristic of the X Y Table.

Figure 4:
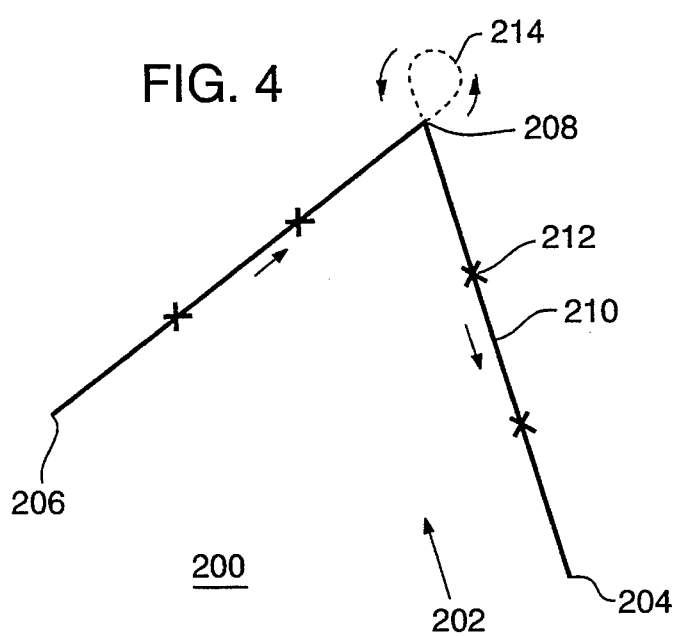
FIGS. 4 is a drawing showing the results achieved when a laser beam cuts a target substrate in accordance with the invention.

With reference to FIG. 4, the surface of a substrate 200 is cut with a non-linear pattern 202 composed of linear paths 204 and 206 joined at an apex 208. Paths 204 and 206 are composed of multiple linear segments 210 joined end to end at termini 212.

An arcuate path 214 represents the relative trajectory of laser 14 across the substrate surface when laser 14 is not emitting a beam. No pattern is imposed on the surface along path 214 while servo 16 continues to move target 18. When the relative position of the laser returns to apex 208 after servo 16 has traversed path 214, control unit 28 restarts laser 14 in correspondence with the motion of servo 16 to locate the initial laser impact of path 204 at the exact terminal point of path 206 at apex 208. The result is an exact matching between paths 206 and 204 and the accurate realization of the pattern data held in program memory 26.

Digital computer 12 can also cause beam emission on the basis of predictive location rather than determined position because of an enhanced ability to keep to a minimum the difference between predictive location and measured position. Emission of laser 14 on the basis of predictive target location allows the laser beam to move at higher relative speeds across the target substrate.

Predictive location data are contained within the stored pattern segment data. Each segment data set is evaluated by computer 12 to determine what signal would cause servo 16 to make the intended move.

By simple calculus, the second derivative of predicted location is acceleration. Computer techniques well known in the art are used to simulate the process of taking the second derivative of predicted location to find the acceleration necessary to cause a servo move from determined position to the next intended location. In an idealized case, acceleration is proportional to torque, and torque is proportional to electrical current supplied to the servomechanism.

In a preferred embodiment, computer 12 derives a signal that would cause servo 16 to be supplied with electrical current appropriate to cause a move from one position to the next intended location. Such a signal represents a close approximation but is an idealized value of a signal that would best realize the intended motion of servo 16. Factors such as friction, and variations in current generator output are not contemplated in such a servo-controlling signal.

Therefore, only the first target segment move is directed according to such a signal. When the first target segment move is completed, the terminal position of the just completed move is determined and compared to its predicted terminal location. The difference is a measure of how the factors of gravity, friction, and error in the current generator have affected the trajectory effected by servo 16. Therefore, a preferred embodiment returns the difference between predicted terminus and measured terminus to computer 12 to adjust the next segment move. Consequently, the idealized current signaling value is fed forward into the next move after being adjusted by the information derived from the past move.

In a preferred embodiment, not only is the difference between predicted and realized terminal points of the immediate prior move used to adjust the next predicted forward command, but several such past differences are considered in combination, along with the past forward terms that resulted in those needed past correction differences, to derive an appropriate command for the next forward move. An appropriate representation of the error correction technique is given by:

$$C_n = K_{FFn}(\alpha_{In}x) + \left[\sum_{n=1}^{n=x} K_{In-1}(\alpha_{In-1} - \alpha D_{n-1}) + \sum_{n=1}^{n=x} K_{On-1}C_{n-1}\right]$$

where $C_n$ is the command that will precipitate servo 16 to move through a segment. The intended x axis destination is $[\alpha_{In}x]$. The factor $\alpha_{Dn}x$ is the determined x axis destinations for move n, and $K_{FFn}$ is the factor appropriate for transposing intended coordinates into operable signals. Similarly, $$[(\alpha_{I_{n-1}} - \alpha_{D_{n-1}})x]$$

is the difference in the just prior segment move between the intended x servo location and the determined x servo location, while $C_{n-1}$ is the previous control command and $K_{In-1}$ and $K_{On-1}$ are previous appropriate constants. The constants $K_{In-1}$, $K_{On-1}$, and $K_{FFn}$ are experimentally derived. The process is repeated for the y axis. It will be appreciated that in the first move the n of the mathematical representation equals 1 and that therefore there is no error correction term since n−1 equals zero. Thus, system 10 maintains a corrective capability to realize submicron correspondence between intended location and realized position.

It will be obvious to those having skill in the art that many changes may be made in the above described details of preferred embodiments of the present invention without departing from the underlying principles thereof. The scope of the invention should, therefore, be determined only with reference to the following claims.

I claim:

1. A method of imposing a pattern on a target substrate through displacement of an intense radiation beam relative to the target substrate, comprising:

directing toward the target substrate a pulsed radiation beam having an output intensity that varies in response to a control signal, the beam output intensity variation and control signal being in a synchronized relationship;

positioning the beam to travel along a displacement path defined by first and second segments joined by an inflection point, the positioning being controlled by a servomechanism that effects relative movement of the beam across the target substrate in response to a position signal, the beam movement and position signal being in a synchronized relationship; and coordinating the control signal and the position signal so that the position signal causes the beam to travel and the control signal causes the beam output intensity to vary at accurately defined locations along the displacement path so that, when the beam reaches the inflection point after traveling the first segment, the control signal synchronously changes the output intensity of the beam, and when the beam begins to travel along the second segment, the control signal synchronously restores the output intensity of the beam at the inflection point.

2. The method of claim 1 in which the coordinating of the control and position signals further comprises:

deriving the control signal and the position signal from a single high speed interrupt routine operating at an interrupt frequency and implemented in software in a microprocessor; and adjusting the frequency of the interrupt routine in response to a desired beam frequency datum.

3. A method of predeterminately operating on select portions of a substrate with radiation by effecting controlled relative coordination between a positional controller and emission from a beam generator with the aid of a digital computer, comprising:

providing the digital computer a data base for use in effecting the controlled relative coordination, the data base including at least a first datum corresponding to beam generator repetition information;

calculating in the computer a primary correlation integer datum and a secondary correlation integer datum;

calculating in the computer a flag signal corresponding to a routine repetition datum related to the primary correlation integer datum and the first datum;

selectively initiating the beam generator in substantial correspondence with a primary correlation integer datum multiple of the flag signal; and selectively initiating the positional control means in substantial correspondence with a secondary correlation integer datum multiple of the flag signal to result in a substantially coincident correspondence between initiation of the beam generating means and the positional control means.

4. The method of claim 3 in which the primary correlation datum is calculated to correlate the first datum to a resolution capacity of the computer.

5. The method of claim 3 in which the first datum is adjusted to correlate the flag signal with a resolution capacity of the computer to result in an adjusted first datum.

6. The method of claim 5 in which an expected velocity of the positional controller is modified in response to a difference between the adjusted first datum and the first datum.

7. The method of claim 3 in which the digital computer and an incremental counting device cooperate to repetitively iterate multiples of datum multiples of the flag signal.

8. The method of claim 3 in which the secondary correlation integer datum provided the digital computer is selected to result in a positional controller initiation readiness repetition rate greater than an oscillatory characteristic of the positional controller.

9. A method of imposing a pattern on a target substrate through displacement of an intense radiation beam relative to the target substrate, comprising:

directing toward the target substrate a radiation beam having an output intensity that varies in response to a control signal, the beam output intensity variation and control signal being in a synchronized relationship;

relatively positioning the beam across the target substrate along first and second displacement segments by use of a servomechanism that effects the relative positioning in response to a position signal; and coordinating the control signal and the position signal so that the position signal causes the beam positioning and the control signal causes the beam output intensity to vary at accurately defined locations along the displacement segments so that, when the beam reaches the end of the first displacement segment, the control signal coincidently stops beam impact upon the target substrate, and when the beam begins along the second displacement segment, the control signal coincidently restores beam impact upon the target substrate.

10. Apparatus for imposing a pattern on a target substrate through relative displacement of an intense radiation beam and the target substrate, comprising:

pulsed radiation means for providing the intense radiation beam having an output intensity that varies in response to a control signal, the beam output intensity and the control signal being in a synchronized relationship;

movement means responsive to a position signal for relatively positioning the intense radiation beam to travel across the target substrate along a displacement path defined by first and second segments joined by an inflection point, the beam positioning and the position signal being in a synchronized relationship; and coordination means for coordinating the control and position signals so that the position signal causes the beam to travel and the control signal causes the beam output intensity to vary at accurately defined locations along the displacement path so that, when the radiation beam reaches the inflection point after traveling the first segment, the control signal coincidently reduces the output intensity of the beam, and when the beam begins to travel along the second segment, the control signal coincidently restores the output intensity of the beam at the inflection point.

11. The apparatus of claim 10 in which the coordination means further comprises a single repetitive signal source operating at a frequency that is controlled in response to a desired beam frequency datum, and in which the control and position signals operate at frequencies having an integer multiple relationship to the signal source frequency.

12. The apparatus of claim 10 in which the coordination means includes a digital microprocessor.

13. The apparatus of claim 10 in which the pulsed radiation means includes a laser.

14. The apparatus of claim 10 in which a variable clock having an operating frequency is operatively associated with the control signal and a fixed clock is operatively associated with the position signal, and in which the coordination means adjusts the variable clock operating frequency to synchronize the control and position signals.

15. The apparatus of claim 10 in which the beam travels at a substantially uniform speed along the first segment and the second segment.

16. The apparatus of claim 10 in which the displacement path is further defined by a circuitous travel path interconnecting the first and second segments at the inflection point and in which the control signal reduces the output intensity of the beam as the beam travels along the circuitous travel path.

17. The apparatus of claim 16 in which the circuitous travel path is a generally closed loop.

18. The apparatus of claim 16 in which the movement means has a limited acceleration response characteristic, and the beam travels along the circuitous path at an acceleration that does not exceed the limited acceleration response characteristic of the movement means.

19. Apparatus for selectively coordinating a beam position controller and emission from a beam generator to predeterminately operate on select portions of a substrate with radiation, comprising:

a beam generator having an output beam with an intensity that varies in correspondence with a control signal, the beam intensity and the control signal being in a synchronized relationship;

a beam position controller positioning the output beam along a displacement path defined by first and second segments joined by an inflection point in correspondence with a position signal, the beam positioning and the position signal being in a synchronized relationship; and coordination means for coordinating the control and position signals so that the position signal causes the beam positioning and the control signal causes the beam output intensity to vary at accurately defined locations along the displacement path so that, when the output beam reaches the inflection point after traveling at a substantially constant speed along the first segment, the control signal coincidently stops beam emission, and when the beam commences travel at the substantially constant speed along the second segment, the control signal coincidently restores beam emission at the inflection point.

20. A method of synchronizing a laser beam pulse emission with a laser movement along a travel path, comprising:

receiving a desired laser beam pulse emission repetition frequency;

calculating in a microprocessor first and second correlation integers related to the desired laser beam pulse emission frequency;

calculating in the microprocessor an interrupt signal having a repetition frequency synchronously related to the first correlation integer;

pulsing the laser beam in substantial coincidence with a first correlation integer frequency relationship of the interrupt signal; and moving the laser in substantial coincidence with a second correlation integer frequency relationship of the interrupt signal such that the laser beam pulse emission is coordinated with the laser movement to synchronize the laser beam emission with a known position along the travel path.

\* \* \* \* \*

UNITED STATES PATENT AND TRADEMARK OFFICE
CERTIFICATE OF CORRECTION

PATENT NO. : 5,453,594
DATED : September 26, 1995
INVENTOR(S) : Karl F. Konecny

It is certified that error appears in the above-indentified patent and that said Letters Patent is hereby corrected as shown below:

Column 7, line 39, which reads "*1001.6025=12,019.23"
should read --12 * 1001.6025 = 12,019.23--.

Column 7, line 41, which reads ",500/12,019.23= 26.0000017"
should read --312,500/12,019.23 = 26.0000017. --.

Column 8, line 44, which reads ".5 KHz=adjusted laser freq*"n"*fit integer"
should read --312.5 KHz = adjusted laser freq * "n" * fit integer--.

Column 8, line 46, which reads ".5 KHz=adjusted laser frequency**20"
should read --312.5 KHz = adjusted laser frequency * 2 * 20--.

Column 8, line 48, which reads ".5 Hz=adjusted laser frequency"
should read --7812.5 KHz = adjusted laser frequency--.

Signed and Sealed this

Fourteenth Day of July, 1998

*Attest:*

BRUCE LEHMAN

*Attesting Officer*  *Commissioner of Patents and Trademarks*